(12) United States Patent
Hunt et al.

(10) Patent No.: US 6,253,234 B1
(45) Date of Patent: Jun. 26, 2001

(54) SHARED WEB PAGE CACHING AT BROWSERS FOR AN INTRANET

(75) Inventors: Gary T. Hunt; Jeffrey O. Fisher; Eddie Lambert, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/953,347

(22) Filed: Oct. 17, 1997

(51) Int. Cl.[7] .............................. G06F 7/00; G06F 17/00; G06F 12/00; G06F 15/167
(52) U.S. Cl. ...................... 709/213; 709/216; 709/218; 709/203; 707/10; 707/201; 707/203; 707/511; 707/513
(58) Field of Search .................................. 707/1, 2, 8, 10; 709/200–205, 213–219, 227, 237, 250

(56) References Cited

U.S. PATENT DOCUMENTS

| | | | |
|---|---|---|---|
| 5,708,780 | 1/1998 | Levergood et al. | 709/229 |
| 5,764,908 | 6/1998 | Shoji et al. | 709/217 |
| 5,809,250 | 9/1998 | Kisor | 709/227 |
| 5,813,007 | 9/1998 | Nielsen | 707/10 |
| 5,826,242 | 10/1998 | Montulli | 705/27 |
| 5,835,914 | 11/1998 | Brim | 707/206 |
| 5,845,290 | 12/1998 | Yoshii | 707/104 |
| 5,852,717 * | 12/1998 | Bhide et al. | 709/203 |
| 5,864,837 * | 1/1999 | Maimone | 707/1 |
| 5,864,854 * | 1/1999 | Boyle | 707/10 |
| 5,867,651 * | 2/1999 | Dan et al. | 709/203 |
| 5,878,218 * | 3/1999 | Maddalozzo, Jr. et al. | 709/213 |
| 5,887,133 | 3/1999 | Brown et al. | 709/200 |
| 5,918,237 | 6/1999 | Montalbano | 707/513 |
| 5,944,780 * | 8/1999 | Chase et al. | 709/201 |
| 5,944,791 | 8/1999 | Scherpbier | 709/218 |
| 5,978,828 | 11/1999 | Greer et al. | 709/203 |

* cited by examiner

Primary Examiner—Kevin J. Teska
Assistant Examiner—William Thomson
(74) Attorney, Agent, or Firm—Jeffrey S. LaBaw; Bracewell & Patterson, L.L.P.

(57) ABSTRACT

Each client in an intranet includes at least the minimum functionality required to serve a remote request such as an HTTP request. Existing browsers within the intranet may share their collective local caches to form a scalable cache. The intranet proxy routes page requests from one client within the intranet to another when a local cache within the intranet contains a current copy of the requested page. A trust protocol insures that clients serving as caches may be trusted by the proxy, while a refresh mechanism such as a time-out policy ensures that the page is reloaded after a predetermined period of time. The collective cache thus scales with the number of browsers in the intranet, and existing browsers may be employed without direct modification. The same mechanism may be utilized, either within a network or through an Internet service provider, to permit individuals and companies to maintain Web sites on their own personal systems without paying fees for uninterrupted connection to the Internet.

16 Claims, 5 Drawing Sheets

| 302 | 304 | 306 | 308 | 310 |
|---|---|---|---|---|
| www.irs.com\default.html | hostname\cache0000 | 04/15/97 | ✓ | |
| www.mysite.com\index.htm | 972/555-1234 | | | |
| | | | | |
| | | | | |

SHARED WEB PAGE CACHING AT BROWSERS FOR AN INTRANET

RELATED APPLICATIONS

The present invention is related to the subject matter of commonly assigned, copending U.S. patent application Ser. No. 08/953,348 entitled "REMOTE/SHARED BROWSER CACHE." The content of the above-mentioned copending application is incorporated herein by reference.

BACKGROUND OF THE INVENTION

1. Technical Field

The present invention relates in general to accessing Web pages and in particular to accessing Web pages in environments including multiple users. Still more particularly, the present invention relates to shared caching of Web pages among multiple users with minimal modifications to existing browsers.

2. Description of the Related Art

The Internet provides a valuable source of both entertainment and information to all segments of society. In addition to commercial enterprises utilizing the Internet as an integral part of their marketing efforts in promoting their products or services, many federal, state, and local government agencies are also employing Internet sites for informational purposes, particularly agencies which must interact with virtually all segments of society such as the Internal Revenue Service and secretaries of state. Operating costs for both commercial enterprises and governmental agencies may be reduced by providing informational guides and/or searchable databases online.

Currently, the most commonly employed method of accessing and distributing data over the Internet is to employ the World Wide Web (WWW) environment, also called simply "the Web." Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling transfer of various data files (e.g., text, still graphic images, audio, motion video, etc.). Information is formatted for transfer and presentation to a user by a standard page description language, the Hypertext Markup Language (HTML).

In addition to basic formatting, HTML allows developers to specify "links" to other Web resources, identified by a Uniform Resource Locator (URL). An URL is a special syntax identifier defining a communications path to an Internet server containing specific logical blocks of information, colloquially called a "page," accessible to an Internet client. Web pages may be of arbitrary size and include text, graphics, forms for submitting queries to databases on the remote server, and other components. A "page" includes all files required to present the information requested utilizing the identifying URL, including text/HTML files, graphics files, sound files, etc.

Retrieval of information on the Web is generally accomplished with an HTML-compatible "browser"—an application program capable of submitting a request for information identified by an URL—at the client machine. The request is submitted to a server connected to the client system and may be handled by a series of servers to effect retrieval of the requested information. The information is provided to the client formatted according to HTML.

When Web pages are retrieved under direct user control, it is common practice for contemporary Web browsers to cache pages accessed by the user. Network bandwidth is finite, and the time required to retrieve a Web page depends in part on the number of servers at the site from which the Web page is being retrieved. Furthermore, Web pages often include sizable graphics files or other large files requiring a substantial amount of time to transfer from the source to the requesting client. Caching Web pages allows a user to repeatedly view the information within a short span of time without retrieving the Web pages each time.

Large traffic demands to specific Web sites can make access to such sites difficult. The amount of time which a user must wait to view a Web page during peak utilization periods can be very long. To ease the difficulty of accessing sites with high traffic demands, Web browsers may retrieve frequently accessed Web pages by off-line browsing. Off-line browsing allows information at the site to be retrieved during off-peak periods without contemporaneous user interaction at the client. The pages are typically retrieved from the originating Internet Web site by off-peak retrieval, or retrieval during periods when traffic to the site is at a minimum. The retrieved pages are cached in a local memory, such as a hard drive, for subsequent off-line viewing by the user without connection to the Web site from which those pages originate.

Caching of Web pages is also performed at proxies. Typically, a local area network is segregated from external networks or systems by a firewall, a barrier designed to stop all data flow in either direction. Proxies, which are installed in addition to or as part of the firewall, handle data transfers between the local network and external sources, including Internet Web sites. Thus, caching in proxies, which serve an entire intranet, can benefit the entire local network. However, caching at a single machine, particularly at a machine that is serving a different purpose, is not scalable.

Another problem relates to the fees charged by service providers for maintaining a Web site (i.e. a Web page and supporting files) for companies or individuals. Often this fee may be very expensive, depending on the services provided or the level of competition among service providers. With respect to the services offered, for example, the service provider may allocate disk space for the individual Web pages and supporting files, provide support personnel for maintaining the Web server, etc. Thus, the fee charged to companies and individuals for maintaining a Web site may become very expensive over time. Furthermore, maintaining a Web site on a server located at premises controlled by the company or individual includes not only front-end costs of purchasing and connecting the server, but also a high monthly fee for maintaining an uninterrupted connection to the Internet.

It would be desirable, therefore, to allow scaling of an available cache by the number of browsers in an intranet or local area network. It would further be advantageous if the mechanism allowing such scaling could be implemented with as little change as possible to existing browsers. It would further be advantageous if the mechanism provided could be employed to support inexpensive maintenance of Web pages for companies and/or individuals.

SUMMARY OF THE INVENTION

It is therefore one object of the present invention to provide an improved method and apparatus for accessing Web pages.

It is another object of the present invention to provide an improved method and apparatus for accessing Web pages in environments including multiple users.

It is yet another object of the present invention to provide a method and apparatus for shared caching of Web pages among multiple users with minimal modifications to existing browsers.

The foregoing objects are achieved as is now described. Each client in an intranet includes at least the minimum functionality required to serve a remote request such as an HTTP request. Existing browsers within the intranet may share their collective local caches to form a scalable cache. The intranet proxy routes page requests from one client within the intranet to another when a local cache within the intranet contains a current copy of the requested page. A trust protocol insures that clients serving as caches may be trusted by the proxy, while a refresh mechanism such as a time-out policy ensures that the page is reloaded after a predetermined period of time. The collective cache thus scales with the number of browsers in the intranet, and existing browsers may be employed without direct modification. The same mechanism may be utilized, either within a network or through an Internet service provider, to permit individuals and companies to maintain Web sites on their own systems without paying fees for uninterrupted connection to the Internet.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
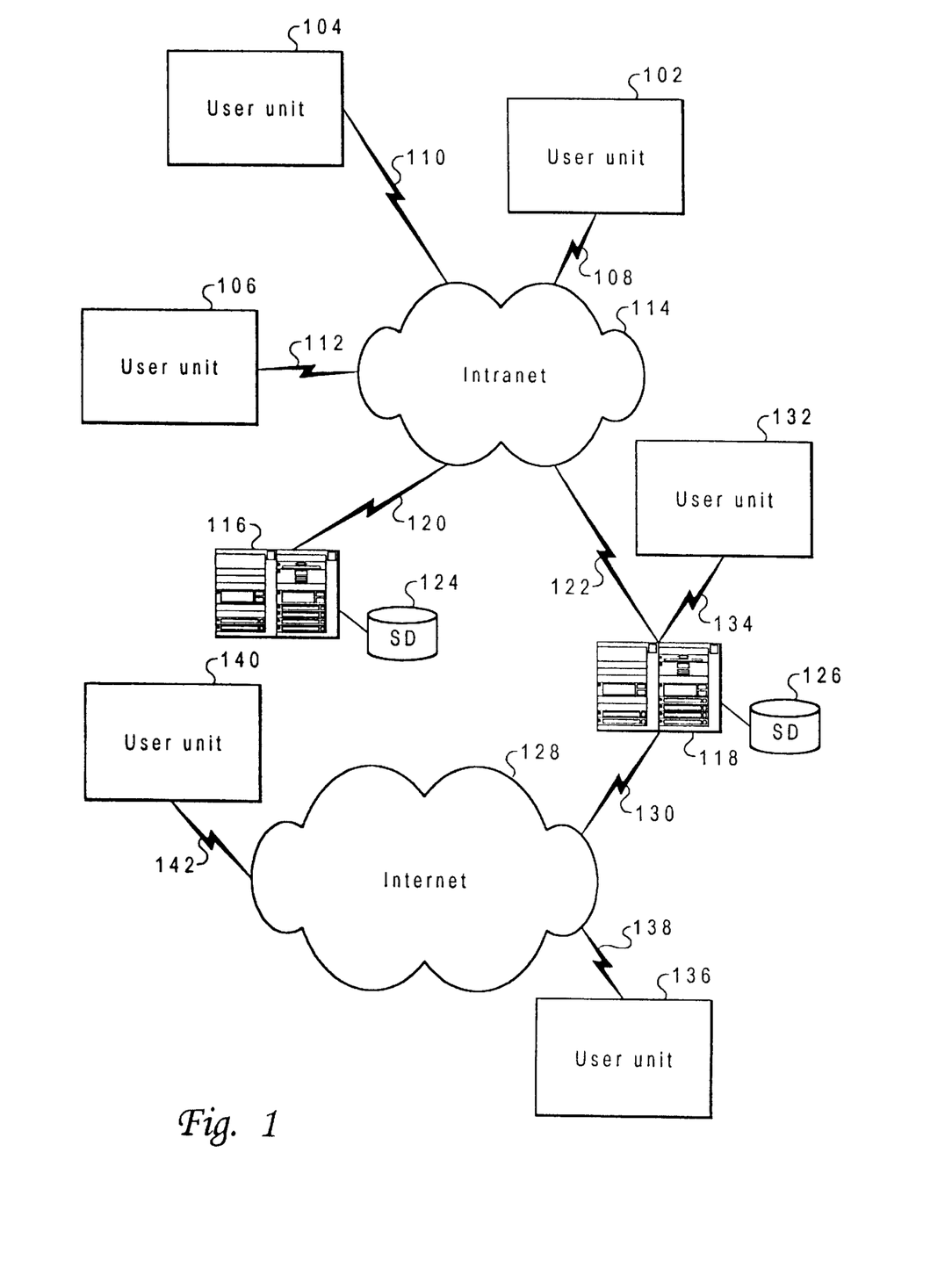
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The network depicted in the exemplary embodiment includes a plurality of user units 102–106 connected via respective communications links 108–112 as part of an intranet 114. An "intranet" is a high bandwidth network of workstations connected to (and protected from) external data processing systems or networks by a firewall and/or proxy. Servers 116–118 are also connected to intranet 114, via communications links 120–122. Intranet 114 supports communications and data transfers among various data processing systems, including user units 102–106 and servers 116–118, by a network technology such as Ethernet, token ring, fiber distributed data interface (FDDI), or asynchronous transfer mode (ATM). Data transmission within intranet 114 may be governed by various protocols, such as frame relay (FR), x.25, integrated services digital network (ISDN), media access control address protocol, or transmission convergence protocol/internet protocol (TCP/IP).

Servers 116–118 include storage devices 124–126, respectively, providing remote storage for user units 102–106. At least one server, server 118 in the depicted example, is connected via communications link 130 to the Internet 128. Communications link 130 may, for example, be provided in the form of access service by an Internet Service Provider (ISP). Server 118 in the exemplary embodiment functions as an Internet or Web server, supporting browser applications running on Internet client systems such as user units 102–106 in retrieval of Web pages formatted in HTML. Such Web pages may be passed via a series of servers within both Internet 128 and intranet 114 to a particular client system within user units 102–106. Thus, intranet 114 may include additional servers (not shown) through which data transfers from server 118 to users units 102–106 pass, or such data transfers may also pass through server 116.

The present invention may also be implemented in the individual systems of homeowners and companies. For example, User unit 132 may be located at a business and connected to server 118 via communications link 134. In this situation, communications link 134 is a dial-up access which may be initiated by either user unit 132 or server 118. Server 118 acts as an ISP for user unit 132, providing communications to the Internet 128 upon demand. User units 136 and 140 are similarly located at the premises of a homeowner or business desiring to establish their own Web site, connected to the Internet 128 via respective communications links 138 and 142, which may be in the form of ISP service employing servers (not shown) to provide the requisite support for selectively activated Internet connection and service and include a proxy as described in connection with server 118. User units 132, 136, and 140 (sometimes referred to hereinafter as "personal servers") contain the Web page or pages and supporting files which the individual or company wishes to establish and maintain.

In accordance with a preferred embodiment of the present invention, server 118 includes a firewall in accordance with the known art and a proxy with the functional capabilities described below. The proxy may include a cache and HTTP serving capabilities. Each user unit 102–106, 132, 136, or 140 which includes a browser also includes a browser cache and at least the minimum functionality required to act as an HTTP server. Because of formatting differences among browser caches, each user unit 102–106 connected to intranet 114 should utilize the same browser, or at least browsers employing a common or standardized cache structure and/or format.

Most existing browsers already cache, but typically do not include HTTP serving capabilities. That is, most browsers are capable of submitting an HTTP request, but are not capable of serving or responding to an HTTP request. The functionality required to serve HTTP requests may be overlaid within user units 102–106 without modification of the existing browser, and may be implemented as a plug-in in some instances. Extensions of the minimum functionality required to serve HTTP request may optionally be included for each user unit 102–106. However, because browser caches are employed in serving requests rather than a traditional file system, the HTTP serving functionality should be cognizant of formatting (including compression) of the Web pages within the browser caches.

Figure 2:
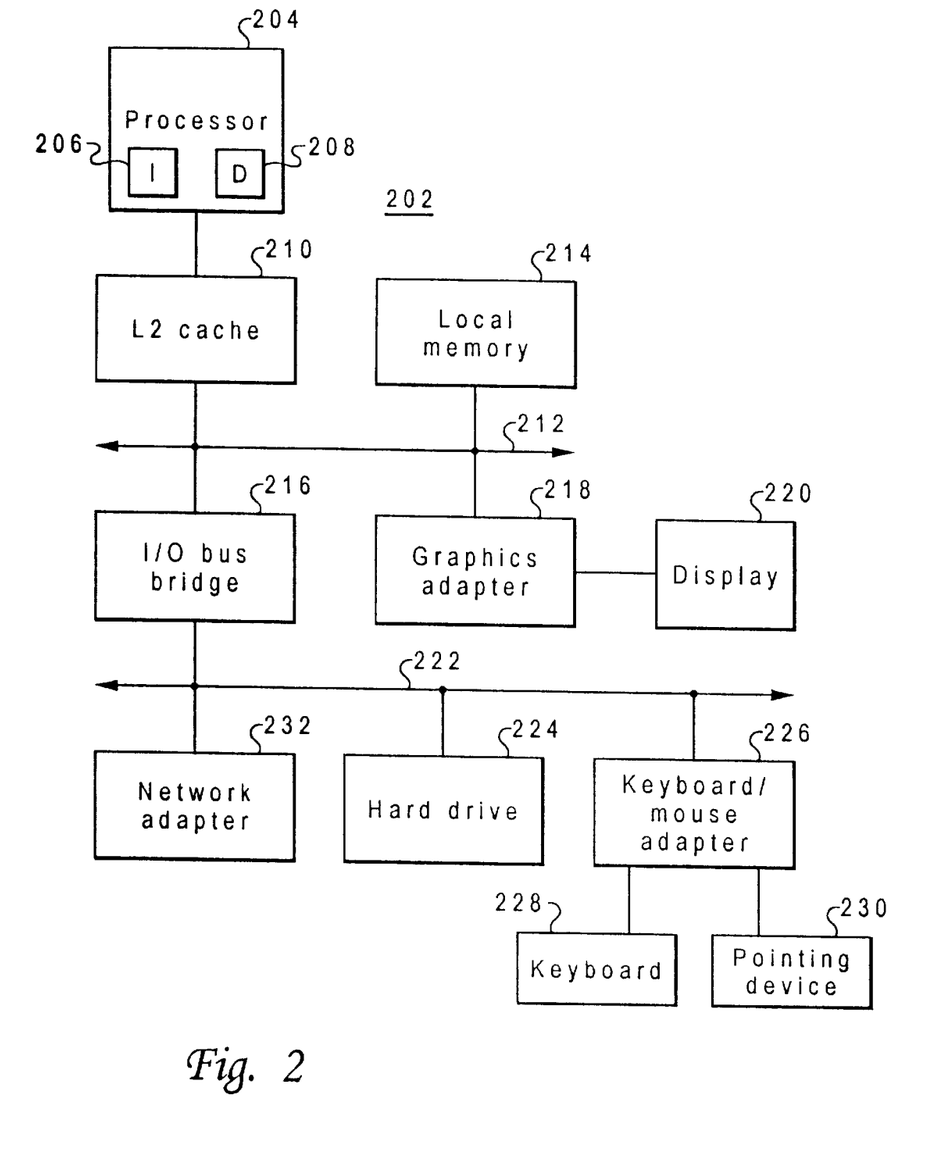
FIG. 2 is a data processing system in which a preferred embodiment of the present invention may be implemented.

Referring to FIG. 2, a data processing system in which a preferred embodiment of the present invention may be implemented is illustrated. Data processing system 202 may be employed as one of user units 102–106 within the network depicted in FIG. 1, or as one of servers 116–118. Modifications to the embodiment depicted may be appropriate depending on how data processing system 202 is utilized.

Data processing system 202 includes a processor 204 having internal level one instruction and data caches 206 and 208. Processor 202 is connected to a level two (L2) cache 210, which is connected via system bus 212 to system memory 214 and to bridge 216. Memory mapped devices, such as graphics adapter 218 connected to display unit 222, may also be connected to system bus 212.

Bridge 216 connects system bus 212 to input/output (I/O) bus 222. Various peripherals may be connected to I/O bus 222, such as hard disk drive 224. Keyboard/mouse adapter 226 connected to I/O bus 222 allows a keyboard 228 and pointing device 230 such as a mouse or trackball to be connected to data processing system 202. Network adapter 232 connected to I/O bus 222 allows data processing system 202 to be connected to a local area network (LAN) such as intranet 114 depicted in FIG. 1, or to the Internet 128.

The operation of data processing system 202 is well known to those skilled in the art. Furthermore, those in the art will recognize that the components depicted in the exemplary embodiment may be varied for purposes of specific applications. For example, additional peripheral devices such as a CD-ROM drive may be incorporated into data processing system 202. In accordance with a preferred embodiment of the present invention, data processing system 202 includes a browser application with the functionality described below supporting remote caching on a shared server.

If data processing system 202 is employed as a server between an intranet and the Internet, such as server 118 depicted in FIG. 1, a proxy having the functionality described below is included. If, on the other hand, data processing system 202 is employed as a client system for accessing Internet Web sites, a browser with caching capability and the functionality required for HTTP serving is be included. Since HTTP is a file transfer protocol, the HTTP serving capability required includes the ability to serve an HTTP request (i.e. locate and provide the requested file from attached media through local file I/O). In addition, the present invention requires additional HTTP serving constraints: First, the HTTP server invokes a file system rather than a host name and/or Internet protocol (IP) address to serve the request. Second, the HTTP server must be cognizant of—or have some means for discovering—how files are stored in the browser caches or personal server, including any formatting or compression within caches which differs from the regular HTML format of the cached Web pages. Additionally, a trust protocol should be established between browsers and the proxy so that browsers serving as caches may be trusted by the proxy. Existing trust protocols employed in similar situations may be readily adapted for specific implementations. For example, the two-way trust protocol marketed as "Kerberos", which utilizes a third party as a repository of credentials to validate communications between two machines, may be adapted for use in the present invention.

Figure 3:
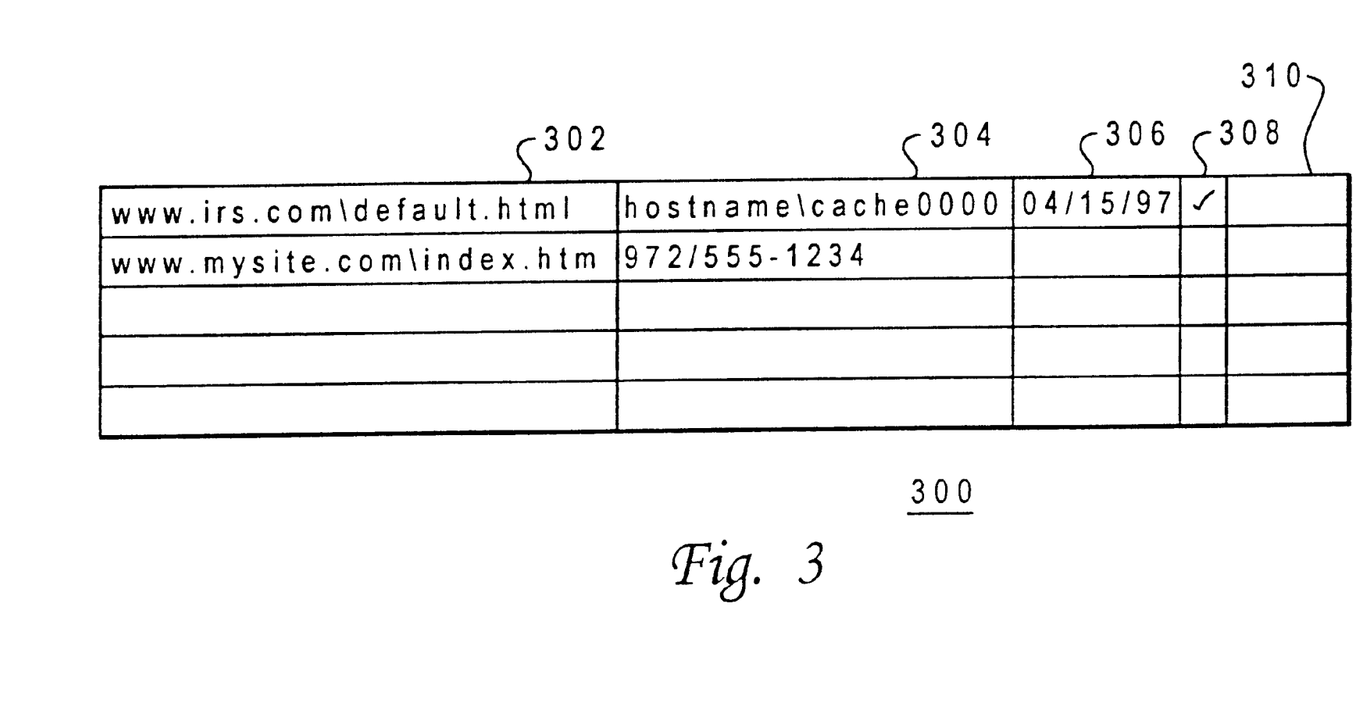
FIG. 3 depicts a data structure employed in remotely caching Web pages at a shared server in accordance with a preferred embodiment of the present invention.

With reference now to FIG. 3, a data structure employed by a proxy in accordance with a preferred embodiment of the present invention is depicted. In the present invention, existing browsers with accompanying local caches may be employed at each client system. Functionality for HTTP serving is overlaid on the browser at each client system. In the context of an intranet, therefore, the individual caches for browsers at each client system may be collectively shared to benefit the entire intranet. In the context of a home-based or company-based Web site maintained on a personal server, the "cache" may actually be the original source for a Web page and supporting files.

In the intranet context, some functionality is required for the proxy to route page requests from one browser in the intranet to the client system at which a cache for another browser contains the requested page. Similarly, in the home-based or company-based Web site embodiment, functionality is required for the proxy to establish or verify a connection to the client system at which the Web page is located and to route the request to that client system. This may entail some protocol conversions where the proxy redirects or reroutes a request for a specific host name or IP address to another browser, or initiation of a communications link to a customer's system where the proxy acts as a surrogate or a conduit between the requesting client application and the personal server.

Data structure 300 may be maintained by the proxy in an intranet to support the required functionality. Data structure 300 includes an identification 302 of the pages maintained within local caches of browsers on the intranet or of the Web pages maintained in personal servers which utilize the proxy as a conduit for requests, specified, for example, by the URL of the page's Internet location. Each entry in data structure 300 also includes an identification 304 of the client system within the intranet having a browser cache which contains a current copy of the page or the customer's personal server which contains the requested Web page.

For shared cache embodiments, cache contents data structure 300 also includes an indicator 306 of the time when the requested page was cached at the client system. This allows a time-value of data algorithm to be applied to cache contents within the intranet. As a simple example, the proxy may be configured to "time-out" a caches Web page after some period of time, such as two hours. In this manner, a reload of the Web page from the Internet source may be guaranteed after a certain period of time. However, a time-out policy is only one refresh mechanism which may be employed in connection with the present invention. An alternative is to have the server at the Web site from which the Web page was retrieved notify the browser when the page is changed. The particular mechanism employed to flush unusable data from caches may be determined by the cache management facilities for the browsers employed within the intranet. That is, the cache management employed should be consistent with or the same as that employed by browsers for local caches. However, since events which result in a determination that cache contents are unusable do not occur on caching browsers, cache management may best be performed by the proxy.

In intranet shared caching embodiments, data structure 300 may also include a flag 308, which may be utilized, for example, to indicate that a client system within the intranet is in the process of loading or updating the requested page, and additional components 310, which may be utilized, for example, by the trust protocol. Data structure 300 is preferably maintained by the proxy in the server at which the proxy resides. A duplicate of data structure 300 may be maintained locally by the browser to expedite access to locally cached material.

In the shared cache implementation, preferably only Web page copies retrieved from the Internet should be identified within data structure 300. Other client systems may copy the page version identified in data structure 300 and cache that version themselves. However, if data structure 300 includes an identification for multiple copies of the same version retrieved from the Internet source, some means for insuring that the "time out" mechanism is satisfied should be implemented. Either the time indicator 306 for cache contents entries must be restricted to the time the copy was retrieved from the Internet (i.e. duplicated from the entry identifying the copy retrieved from the Internet source) or an indicator of which version was retrieved from the Internet must be included in cache contents data structure 300.

In the surrogate Web site server embodiment of the present invention, data structure 300 acts as a surrogate list and may contain other information. Data structure 300 still includes an identifier 302 of pages for which the Web server acts as a surrogate, but identification 304 contains a communications link identifier enabling a communications link to be selected or established for retrieval of the requested page.

Figure 4A:
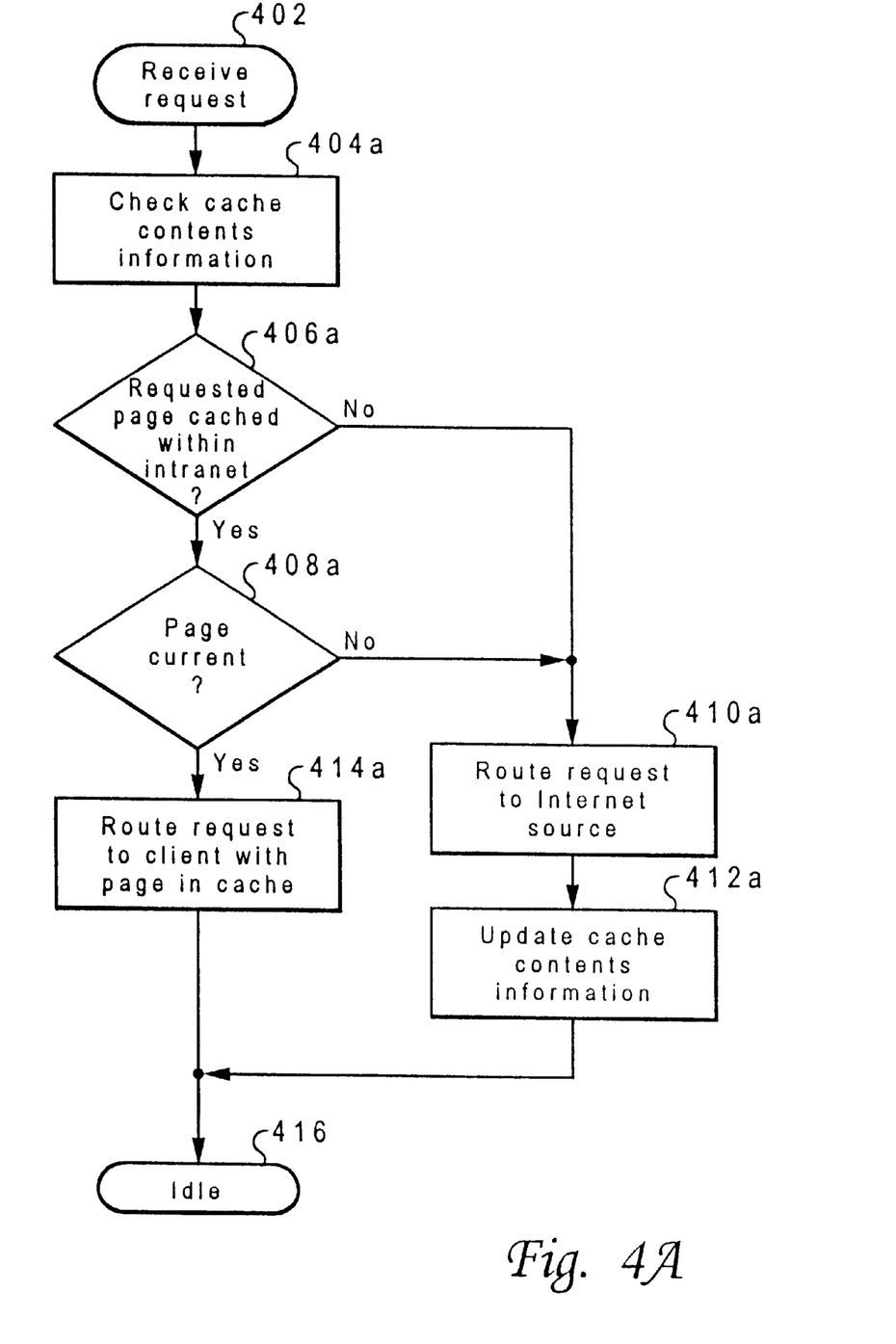
FIG. 4A–4B are high level flowcharts for a process of routing page requests within an intranet having a collective shared cache or to a personal server in accordance with a preferred embodiment of the present invention.
Figure 4B:
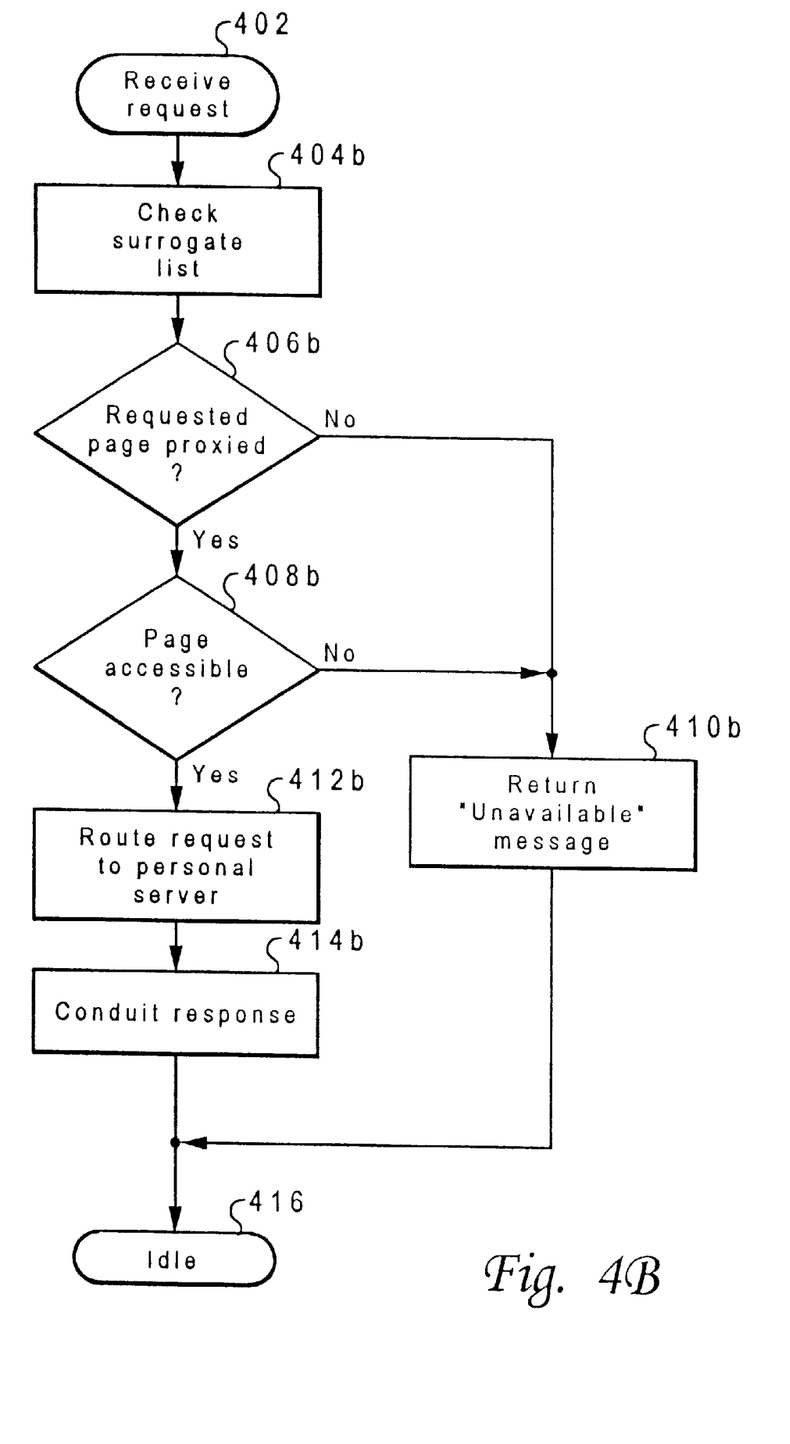

Referring to FIGS. 4A–4B, high level flowcharts for a process of routing page requests within an intranet having a collective shared cache or to a personal server in accordance with a preferred embodiment of the present invention is illustrated. The process depicted in FIG. 4A is adapted for use in the intranet collective shared cache embodiment of the present invention. The process may be employed by a proxy within an intranet implementing a collective shared cache among browsers. The process begins at step 402, which depicts receiving a request for a Web page from a browser. The process thus begins when the proxy receives a request for a page. If browsers within an intranet are configured to check a local cache first, the proxy may never receive a request. Once a request is received, however, the process then passes to step 404a, which illustrates checking the cache contents information of caches within the intranet, such as by checking data structure 300 depicted in FIG. 3.

The process next passes to step 406a, which depicts a determination of whether the requested Web page is cached within the intranet. If not, the process proceeds to step 410a, described below. If so, however, the process proceeds instead to step 408a, which illustrates a determination of whether the version of the page cached within the intranet is current, or whether the page has "timed out." If the cached version of the page is not current, the process proceeds to step 410a, which illustrates routing the request to the Internet source of the requested page, and then to step 412a, which depicts updating the cache contents information, such as by deleting the cache contents entry for the requested page.

Before routing a request to the browser, the proxy may send a short "heartbeat" packet to the browser to verify that the client system on which the browser is located is operational and that there are no difficulties accessing the cache. If the cache is not accessible, the proxy may look for a secondary local cache containing the local page or simply route the request to the Internet source of the requested page. If a difficulty arises after the request has been forwarded to an intranet browser, a timeout may be utilized by the proxy to reroute the request to the Internet source.

Referring again to step 408a, if the cached version of the requested page is current, the process proceeds instead to step 414a, which illustrates routing the request to the client system with the requested page in a local cache. This routing of requests may be achieved using methods well-known in the art for routing HTTP requests. The process then passes to step 416, which illustrates the process becoming idle until another request for a Web page is received.

Since an object of the present invention is to avoid changing the browser, cache management is left to the browser. Virtually all contemporary browsers cache locally by default, and the first browser to retrieve a specific page will log the presence of that page with the proxy. Subsequent browsers which also retrieve the same page, either from the Internet source or from the local intranet cache, will also attempt to log the presence of the page with the proxy. The proxy may either reject this attempt or note the second browser as a secondary cache source for the page. The browsers, however, are responsible for choosing a victim and evicting a page when space is required to cache a newly received page.

Usually an intranet includes only one proxy. In an intranet with more than one proxy, however, the browsers may interact with one or both proxies. Some coordination between the proxies may be required to keep the cache contents current for both proxies, such as informing a nonselected proxy when a user unit retrieves and caches a Web page through a currently selected proxy, allowing the nonselected proxy to update cache contents information to reflect the newly retrieved page.

A variety of specific implementations may be employed in connection with the present invention. For example, the caching browsers may be configured as file serving peers rather than as HTTP servers, with the proxy configured as an HTTP server and a file serving client system. HTTP requests redirected by the proxy would then require protocol conversion, from IP to remote file I/O. However, proxies which cache already make such protocol conversions when serving an HTTP request from a local disk. Since retrieval of the file from through local file I/O is usually local/remote transparent, such that a caching proxy should be capable of making the required protocol conversion without modification. The proxy should be aware of the contents of the caches in the networks, and the HTTP server on the proxy should also be cognizant of the cache file format employed by the browser caches.

Another alternative involves configuring the proxy to act as an HTTP client application (browser). Instead of rerouting HTTP requests, the proxy may fetch the requested Web pages and pass them back to the requesting browser, a sort of "bucket brigade" approach to retrieving pages from the browser caches. Yet another alternative involves rerouting HTTP requests with protocol conversion and/or cache access notification to the browsers. Finally, although the preferred embodiment utilizes browsers which are not specially modified for the invention, any of the embodiments described above may employ modifications to the browsers to facilitate or improve access to browser caches by other browsers in the intranet. For example, a protocol could be established coordinating contents of the cache, altering the browsers not to cache locally by default and implementing management schemes for optimization and load balancing of the shared cache.

The intranet shared caching embodiment of the present invention allows existing browsers to collectively share local caches without direct modification to the browser. In effect, every browser on the intranet contributes to the caching of Web pages for the entire intranet. The caching solution thus scales the available cache with the number of browsers in the network, a much higher scaling than is possible under existing cache implementations.

The concept of the intranet shared cache embodiment of the present invention may be expanded to include regular HTTP servers within the intranet as well. In some large networks, HTTP servers are employed to provide interfaces to searchable databases to remote locations within the intranet. HTTP servers, however, do not actively access other Web pages, as do proxies which handle requests from client applications to the Internet. However, an additional protocol could be defined allowing an HTTP server to "skulk" or "snoop" incoming Web pages and cache those which are not already cached. If successful, the HTTP server could then inform the proxy that it has a current copy of the Web page and is available to serve requests for that page using the same protocols discussed above for browsers. Thus, cached pages may be maintained at several locations within an intranet, including a client system and a peer server, providing some degree of fault tolerance (i.e. a users turns off the client system by mistake) and permitting a load balancing scheme to be implemented.

FIG. 4B depicts a process of handling requests for a Web page located on a personal server and proxied to a surrogate server. The process depicted may be implemented within a proxy, similar to the intranet shared cache embodiment described above, or in a server having HTTP serving functionality with the ability to act as a proxy or surrogate. The process begins at step 402, which depicts receiving a request for a Web page located on a personal server for which the receiving server acts as a proxy or surrogate. The process then passes to step 404b, which illustrates checking the surrogate list to verify that the requested Web page is accessible via proxy at the receiving entity and to determine the communications link necessary to forward the request.

The process next passes to step 406b, which depicts a determination of whether the requested Web page is located at a personal server for which the receiving server acts as a surrogate. If not, the process proceeds to step 410b, which depicts returning an "Unavailable" message to the requesting client application. If so, however, the process proceeds instead to step 408b, which depicts a determination of whether the requested page is accessible (i.e. whether a required communications link to the personal server containing the requested page may be successfully established and whether the HTTP serving capability of the personal server is operable). If not, the process proceeds to step 410b. If so, the process proceeds next to step 412b, which depicts routing the request to the personal server, and then to step 414b, which illustrates acting as a conduit for the response, conveying the response received from the personal server to the requesting entity. The process then passes to step 416, which illustrates the process becoming idle until another request requiring the Web server surrogate embodiment of the present invention.

The surrogate web server embodiment of the present invention allows cost-effective implementation of personal Web sites, since the personal server owner may be charged only a relaying fee to the owner of the proxy or surrogate server. Since the Web site data is resident on a personal server, the relaying fee may be based on data throughput or time used serving as a proxy rather than storage capacity, allowing larger Web sites to be maintained with less expense. The benefit also extends to Web sites which are not frequently accessed, since little data throughput or server time is utilized. Additionally, personal server owners would have more freedom in taking their system "offline" for necessary maintenance, and may update their Web sites more frequently with less difficulty. "Offline" periods for the personal Web server would not affect operation of the proxy server in receiving, relaying, and transmitting responses for requests to other personal servers assisted by the proxy server.

The two embodiments of the present invention described are not mutually exclusive, but may be implemented together to achieve synergy in handling requests. The surrogate Web server embodiment may be implemented readily within an intranet, for example, to allow users of the intranet to maintain individual Web pages locally without utilizing space on a server providing proxy connection to the Internet.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of sharing browser caches in an intranet, comprising:

provising each browser within an intranet with the capability to serve HTTP requests;

determining whether an HTTP request from a browser within the intranet for a page from a source outside the intranet seeks a page contained in a shared browser cache maintained by a browser on a data processing system in the intranet;

rerouting the HTTP request to the browser maintaining the shared browser cache containing the requested page; and serving an HTTP response to the HTTP request utilizing the browser maintaining the shared browser cache containing the requested page.

2. The method of claim 1, further comprising:

maintaining cache contents information for each shared browser cache within the intranet, wherein the cache contents information is accessible to each browser within the intranet.

3. The method of claim 1, wherein the step of determining whether an HTTP request from a browser within the intranet seeks a page contained in a shared browser cache maintained by a browser on a data processing system in the intranet further comprises:

receiving an HTTP load request from a requesting browser within the intranet for a page; and checking the cache contents information to determine if a shared browser cache within the intranet contains the requested page.

4. The method of claim 1, wherein the step of rerouting the HTTP request to the browser maintaining the shared browser cache containing the requested page further comprises:

responsive to determining that the request seeks a page contained within a shared browser cache within the intranet, determining whether the requested page needs to be updated; and responsive to determining that the requested page does not need to be updated, routing the HTTP request to an server for the data processing system maintaining the shared browser cache containing the requested page.

5. A method of sharing caches in an intranet, comprising:

for each system within the intranet including a browser capable of serving HTTP requests from other systems within the intranet, storing retrieved pages in a local cache associated with the browser;

maintaining cache contents for each local cache within the intranet, wherein the cache contents includes a retrieval time for each page within a corresponding local cache;

upon receiving an HTTP request from a browser within the intranet for a page identified by an URL outside the intranet:

determining from the cache contents whether any local cache contains the requested page and, if so, whether the requested page requires updating;

responsive to determining that a local cache contains the requested pace and that updating is not required, rerouting the HTTP request to a browser within the intranet maintaining the local cache containing the requested page without transmitting the HTTP request to a source for the requested page and serving a response to the HTTP request from the browser maintaining the local cache containing the requested page;

responsive to determining that a local cache contains the requested page but that the requested page requires updating, routing the HTTP request to the source; and    responsive to determining that no local cache contains the requested page, routing the HTTP request to the source.

6. The method of claim 5, wherein the step of storing retrieved pages in a local cache further comprises:

storing retrieved pages in a local cache within a client.

7. The method of claim 5, wherein the step of storing retrieved pages in a local cache further comprises:

storing retrieved pages in a local cache within a server.

8. An intranet, comprising:

a plurality of user units each having a browser maintaining a shared browser cache and having HTTP serving capabilities; and a server connected to each of the plurality of user units and providing Internet access to the plurality of user units, wherein the server, upon receiving an HTTP request from a user unit within the intranet for a page from a source outside the intranet, determines whether the page requested by the HTTP request is contained within a shared browser cache on a user unit within the intranet and, responsive to determining that the requested page is contained within a shared browser cache on a user unit within the intranet, redirects the ETTP request to the user unit within the plurality of user units which maintains the shared browser cache containing the page requested by the request without transmitting the request to the source.

9. The intranet of claim 8, wherein the server further comprises:

a proxy receiving and redirecting requests.

10. The intranet of claim 8, wherein each user unit within the plurality of user units further comprises:

a browser for Internet access.

11. The intranet of claim 8, wherein the server further comprises:

a firewall protecting the plurality of users units from external data processing systems connected to the intranet; and a proxy providing the Internet access to the plurality of user units.

12. An Internet client, comprising:

a data processing system functioning as an intranet client maintaining a shared browser cache and capable of serving an HTTP request; and a connection to the data processing system for a server containing a proxy, wherein the data processing system serves an HTTP request for a page from a source outside the intranet which is rerouted by the server to the data processing system from another intranet client.

13. The Internet client of claim 12, further comprising:

a browser application for retrieving requested pages.

14. The Internet client of claim 13, wherein data processing system converts the HTTP request to a protocol required to retrieve the requested page from the shared browser cache.

15. A computer program product in a computer usable medium, comprising:

instructions in the computer usable medium for establishing a data processing system executing the instructions as an intranet peer maintaining a shared browser cache;

instructions in the computer usable medium for providing HTTP serving capabilities to a browser executing within the data processing system;

instructions in the computer usable medium for receiving an HTTP request for a page identified by a URL for a system other than the data processing system, wherein a copy of the requested page is contained within the shared browser cache; and instructions in the computer usable medium for serving the request from the shared browser cache utilizing the browser.

16. The computer program product of claim 15, wherein the instructions for serving the request from the shared browser cache further comprise:

instructions for converting the request to a protocol required to retrieve the page from the shared browser cache.

* * * * *

UNITED STATES PATENT AND TRADEMARK OFFICE
CERTIFICATE OF CORRECTION

PATENT NO. : 6,253,234 B1
DATED : June 26, 2001
INVENTOR(S) : Hunt et al.

It is certified that error appears in the above-identified patent and that said Letters Patent is hereby corrected as shown below:

Column 11,
Line 54, please change the word "ETTP" to -- HTTP --

Signed and Sealed this

Seventh Day of May, 2002

Attest:

Attesting Officer

JAMES E. ROGAN
*Director of the United States Patent and Trademark Office*